US012662873B2

(12) United States Patent
Pai

(10) Patent No.: US 12,662,873 B2
(45) Date of Patent: Jun. 23, 2026

(54) PULLING CORD CONTROL DEVICE FOR WINDOW BLIND

(71) Applicant: UNION WINNER INTERNATIONAL CO., LTD., Taipei City (TW)

(72) Inventor: Ming-Tsung Pai, Caotun Township (TW)

(73) Assignee: UNION WINNER INTERNATIONAL CO., LTD., Taipei City (TW)

( * ) Notice: Subject to any disclaimer, the term of this patent is extended or adjusted under 35 U.S.C. 154(b) by 187 days.

(21) Appl. No.: 18/598,087

(22) Filed: Mar. 7, 2024

(65) Prior Publication Data

US 2025/0188796 A1 Jun. 12, 2025

(30) Foreign Application Priority Data

Dec. 6, 2023 (TW) ................................ 112213338

(51) Int. Cl.
*E06B 9/322* (2006.01)

(52) U.S. Cl.
CPC ...... *E06B 9/322* (2013.01); *E06B 2009/3225* (2013.01)

(58) Field of Classification Search
CPC ..... E06B 2009/3225; E06B 2009/3222; E06B 9/322
See application file for complete search history.

(56) References Cited

U.S. PATENT DOCUMENTS 5,799,715 A * 9/1998 Biro ........................ E06B 9/322 160/170
6,508,293 B1 * 1/2003 Huang .................... E06B 9/322 160/170
6,761,203 B1 * 7/2004 Huang .................... E06B 9/322 160/192
7,562,688 B2 * 7/2009 Wetsema ................ E06B 9/322 160/171
7,984,745 B2 * 7/2011 Wen ........................ E06B 9/322 160/170
8,893,763 B2 * 11/2014 Huang .................... E06B 9/322 160/170
8,925,615 B2 * 1/2015 Lin ......................... E06B 9/322 160/170

(Continued)

*Primary Examiner* — Johnnie A. Shablack
(74) *Attorney, Agent, or Firm* — Birch, Stewart, Kolasch & Birch, LLP

(57) ABSTRACT

A pulling cord control device for a window blind includes a frame including first and second seats connected to form an accommodating space and including first and second bases respectively, and a pulling cord control wheel set and at least one coil spring disposed in the accommodating space. The second seat includes at least one dividing rack integrally extending from the second base toward the first base and including two protruding base portions and a dividing plate integrally connected with the protruding base portions so that two cord passing grooves are formed on two opposite sides of the dividing plate respectively. The pulling cord control wheel set includes at least one pulling cord winding portion facing toward the cord passing groove, and coil spring winding portions the coil spring is wound thereon. The present invention is simple in structure, fast in assembly and low in cost.

20 Claims, 17 Drawing Sheets

(56) References Cited

U.S. PATENT DOCUMENTS 8,936,062 B2 * 1/2015 Huang E06B 9/322 160/170
9,127,500 B2 * 9/2015 Huang E06B 9/322
9,260,912 B2 * 2/2016 Huang E06B 9/322
9,309,716 B2 * 4/2016 Chen E06B 9/324
9,366,077 B2 * 6/2016 Chen E06B 9/322
9,482,049 B2 * 11/2016 Chen E06B 9/322
9,587,428 B2 * 3/2017 Huang E06B 9/322
9,797,189 B2 * 10/2017 Huang E06B 9/262
9,874,057 B2 * 1/2018 Huang E06B 9/322
9,963,933 B2 * 5/2018 Chen E06B 9/303
10,273,748 B2 * 4/2019 Chen E06B 9/322
10,273,749 B2 * 4/2019 Lei E06B 9/322
10,480,244 B2 * 11/2019 Chen E06B 9/42
10,494,862 B2 * 12/2019 Zhang E06B 9/303
10,641,039 B2 * 5/2020 Chen E06B 9/322
10,704,323 B2 * 7/2020 Chen E06B 9/322
10,822,871 B2 * 11/2020 Chen E06B 9/322
10,982,488 B2 * 4/2021 Chen B65H 75/486
11,047,172 B2 * 6/2021 Huang E06B 9/322
11,261,655 B2 * 3/2022 Huang E06B 9/322
11,448,012 B2 * 9/2022 Huang E06B 9/262
12,098,593 B2 * 9/2024 Chen E06B 9/322
12,421,795 B2 * 9/2025 Luo E06B 9/322
2007/0227677 A1 * 10/2007 Yu E06B 9/322 160/170
2011/0290429 A1 * 12/2011 Cheng E06B 9/322 160/84.02
2014/0083631 A1 * 3/2014 Huang E06B 9/80 160/170
2014/0224431 A1 * 8/2014 Lin E06B 9/262 160/84.01
2015/0136892 A1 * 5/2015 Hung E06B 9/322 242/397.5
2015/0275572 A1 * 10/2015 Huang E06B 9/322 160/173 R
2015/0275573 A1 * 10/2015 Huang E06B 9/322 160/192
2016/0312528 A1 * 10/2016 Huang E06B 9/322
2017/0107075 A1 * 4/2017 Hung E06B 9/322
2018/0202220 A1 * 7/2018 Huang E06B 9/322
2018/0313143 A1 * 11/2018 Chang E06B 9/322
2019/0063147 A1 * 2/2019 Cheng E06B 9/322
2019/0323291 A1 * 10/2019 Chen E06B 9/368
2020/0399955 A1 * 12/2020 Chen E06B 9/322
2021/0079722 A1 * 3/2021 Liang E06B 9/322
2021/0079723 A1 * 3/2021 Liang E06B 9/327
2021/0254400 A1 * 8/2021 Lin E06B 9/322
2022/0120133 A1 * 4/2022 Lei E06B 9/322
2024/0175314 A1 * 5/2024 Huang E06B 9/322
2024/0360720 A1 * 10/2024 Liang E06B 9/262
2025/0188796 A1 * 6/2025 Pai E06B 9/322
2025/0215746 A1 * 7/2025 Hung E06B 9/322

* cited by examiner

PULLING CORD CONTROL DEVICE FOR WINDOW BLIND

BACKGROUND OF THE INVENTION

1. Field of the Invention

The present invention relates generally to window blinds and more particularly, to a pulling cord control device for a window blind.

2. Description of the Related Art

Referring to U.S. Pat. No. 9,587,428B2, a conventional window blind includes a headrail, and a pulling cord control device disposed in the headrail. The pulling cord control device includes a frame, and two cord winding wheels and two coil spring winding wheels, which are disposed in the frame. The coil spring winding wheels are engaged with each other and collectively arranged for a coil spring to be wound thereon. The cord winding wheels are engaged with the coil spring winding wheels respectively, and each arranged for a pulling cord to be wound thereon. The pulling cords pass through two sides of the frame respectively, and pass through the headrail and slats of the window blind so as to be connected with the bottom rail of the window blind. Through the effect of the pulling cord control device, the user can pull the bottom rail of the window blind to control the opening and closing of the window blind, and can stop the bottom rail at any position between the uppermost position, where the window blind is fully folded, and the lowermost position, where the window blind is fully unfolded. However, the above-described pulling cord control device is complex in structure, causing many assembling steps and high producing cost.

On the other hand, the above-described window blind usually further has a pulling cord resistance device for providing resistance to the pulling cords, which is usually disposed in the headrail of the window blind. The pulling cord resistance device includes a seat fixed to the headrail, and a resistance rod rotatably disposed on the seat. The pulling cords are wound around the resistance rod according to the resistance requirement. However, such window blind is complex in structure, causing many assembling steps and high producing cost.

SUMMARY OF THE INVENTION

The present invention has been accomplished in view of the above-noted circumstances. It is a primary objective of the present invention to provide a pulling cord control device for a window blind, which is simple in structure, relatively faster in assembling process and relatively lower in producing cost.

In view of the above-noted circumstances, it is another objective of the present invention to provide a pulling cord control device for a window blind, which can provide resistance to the pulling cord, so that the window blind requires no additional pulling cord resistance device and thereby has the advantages of being simple in structure, relatively faster in assembling process and relatively lower in producing cost.

To attain the aforementioned primary objective, the present invention provides a pulling cord control device for a window blind. The pulling cord control device includes a frame, a pulling cord control wheel set, and at least one coil spring. The frame includes a first seat and a second seat, which are connected with each other, and an accommodating space formed between the first seat and the second seat. The first seat includes a first base. The second seat includes a second base, and at least one dividing rack integrally extending from the second base. The second base includes an inner surface facing toward the first base. The dividing rack includes two protruding base portions and a dividing plate. The protruding base portions protrudes out of the inner surface of the second base. The protruding base portion has a connected part. The dividing plate is integrally connected with the connected parts of the protruding base portions so that two cord passing grooves are formed on two opposite sides of the dividing plate respectively. The pulling cord control wheel set is disposed in the accommodating space of the frame. The pulling cord control wheel set includes at least two coil spring winding portions, and at least one pulling cord winding portion. The pulling cord winding portion faces toward the cord passing groove of the frame. The coil spring is wound around the coil spring winding portions of the pulling cord control wheel set.

As a result, the frame of the above-described pulling cord control device is composed of only the first and second seats connected with each other, which has simple structure formed with the divided cord passing grooves for pulling cords wound around different pulling cord winding portions to pass through different cord passing grooves to extend to slats of the window blind, thereby preventing the pulling cords from interference with each other. More specifically speaking, the structure for dividing the pulling cords, i.e. the dividing rack, is integrally included in the second seat, so that the pulling cord control device has relatively fewer components and simple structure, thereby relatively faster in assembling process and relatively lower in producing cost.

Preferably, the second base includes an outer surface facing toward opposite direction to the inner surface, and at least one groove penetrating through the inner surface and the outer surface. The dividing rack is located in the groove. Each protruding base portion extends from the outer surface of the second base, extends through the groove, and protrudes out of the inner surface of the second base. Each protruding base portion has a recess recessed from the outer surface of the second base to the connected part. The above-described configuration design of the dividing rack enables the second seat to be molded by only an upper mold and a lower mold, and after the molding, the demolding is performed only upwardly and downwardly to the upper and lower molds respectively. Such manufacturing process is relatively faster and the producing cost is relatively lower.

To attain the aforementioned another objective, the above-described pulling cord control device for the window blind may further include at least one resistance pillar. The resistance pillar is rotatably disposed between the first seat and the second seat.

Resulted from the above-described configuration design, the above-described pulling cord control device can be provided with the resistance pillar between the first seat and the second seat of the frame for the user to wind the pulling cord around the resistance pillar according to the required pulling cord resistance, so as to improve the stability of the pulling cord control device controlling the pulling cord. In other words, the above-described pulling cord control device can be improved in function thereof, i.e. providing resistance to the pulling cord, by being provided with the resistance pillar. In this way, the window blind requires no additional pulling cord resistance device, so that the window blind, in its entirety, has relatively fewer components and simple structure, thereby relatively faster in assembling process and relatively lower in producing cost.

To attain the aforementioned another objective, the present invention further provides another pulling cord control device for a window blind, which includes a frame, at least one resistance pillar, a pulling cord control wheel set, and at least one coil spring. The frame includes a first seat and a second seat, which are connected with each other, an accommodating space formed between the first seat and the second seat, and at least one dividing rack. The first seat includes a first base. The second seat includes a second base, and at least one installation portion connected with the second base. The dividing rack is disposed on the installation portion of the second seat. The dividing rack includes a dividing plate so that two cord passing grooves are formed on two opposite sides of the dividing plate respectively. The resistance pillar is rotatably disposed between the first seat and the second seat. The pulling cord control wheel set is disposed in the accommodating space of the frame. The pulling cord control wheel set includes at least two coil spring winding portions, and at least one pulling cord winding portion. The pulling cord winding portion faces toward the cord passing groove of the frame. The coil spring is wound around the coil spring winding portions of the pulling cord control wheel set.

As a result, the above-described pulling cord control device not only can attain the effects of controlling the pulling cord and preventing the pulling cord from interference, but also is adapted for the user to wind the pulling cord around the resistance pillar according to the required pulling cord resistance, so as to improve the stability of the pulling cord control device controlling the pulling cord. In other words, the above-described pulling cord control device can be improved in function thereof, i.e. providing resistance to the pulling cord, by being provided with the resistance pillar. In this way, the window blind requires no additional pulling cord resistance device, so that the window blind, in its entirety, has relatively fewer components and simple structure, thereby relatively faster in assembling process and relatively lower in producing cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
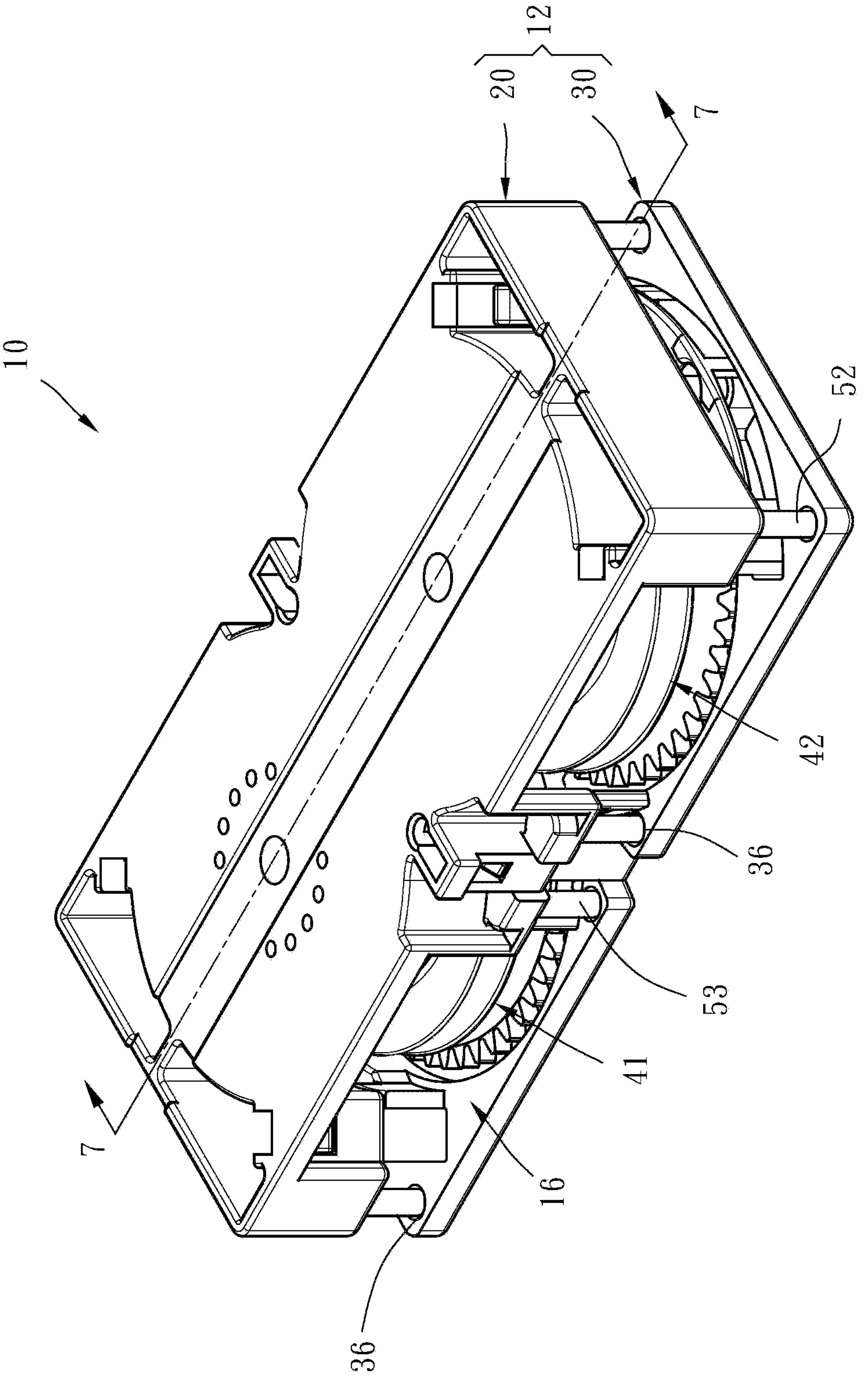
FIG. 1 is an assembled perspective view of a pulling cord control device for a window blind according to a first preferred embodiment of the present invention.

First of all, it is to be mentioned that same or similar reference numerals used in the following embodiments and the appendix drawings designate same or similar elements or the structural features thereof throughout the specification for the purpose of concise illustration of the present invention.

Figure 2:
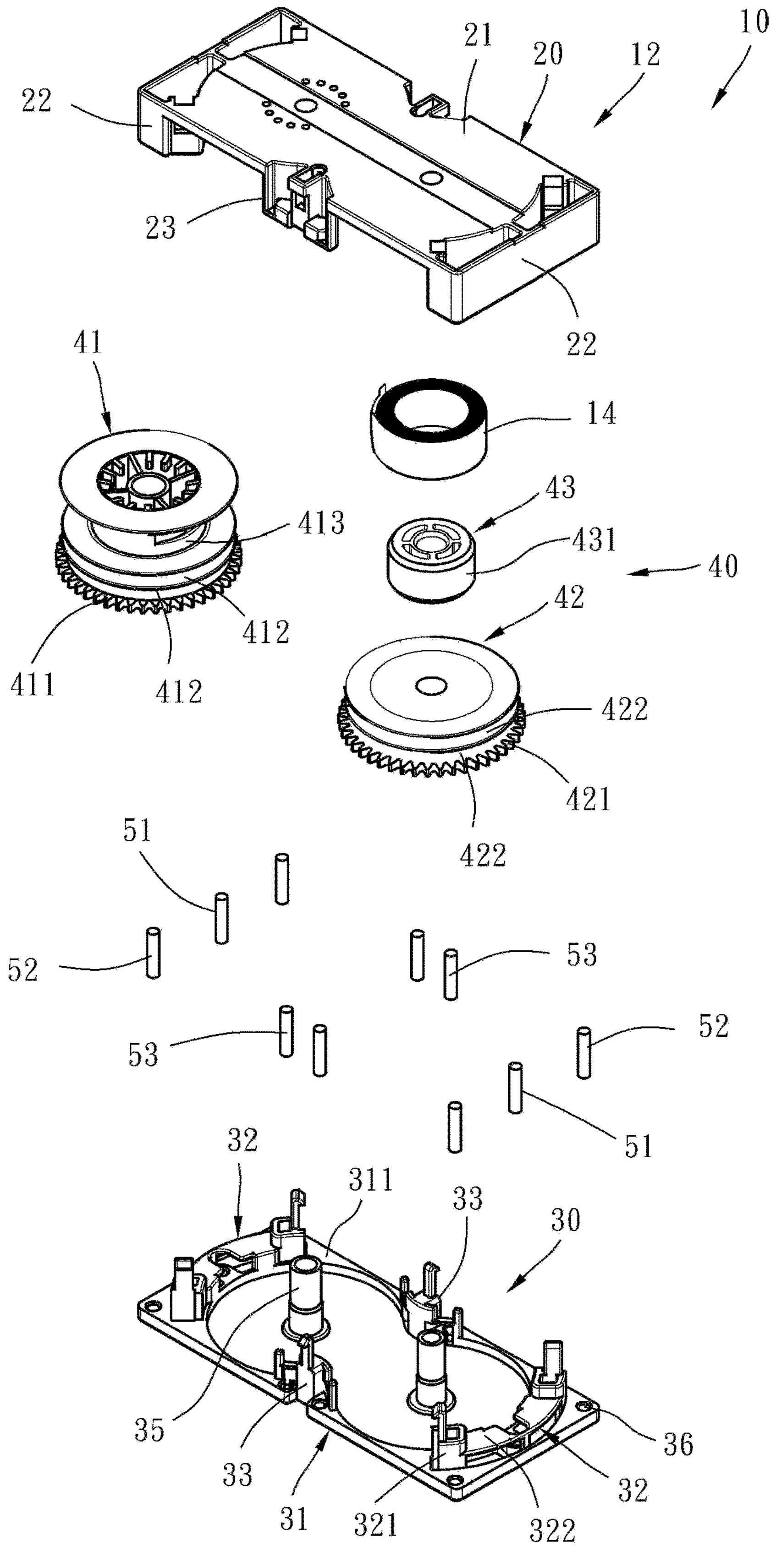
FIG. 2 is an exploded perspective view of the pulling cord control device.
Figure 3:
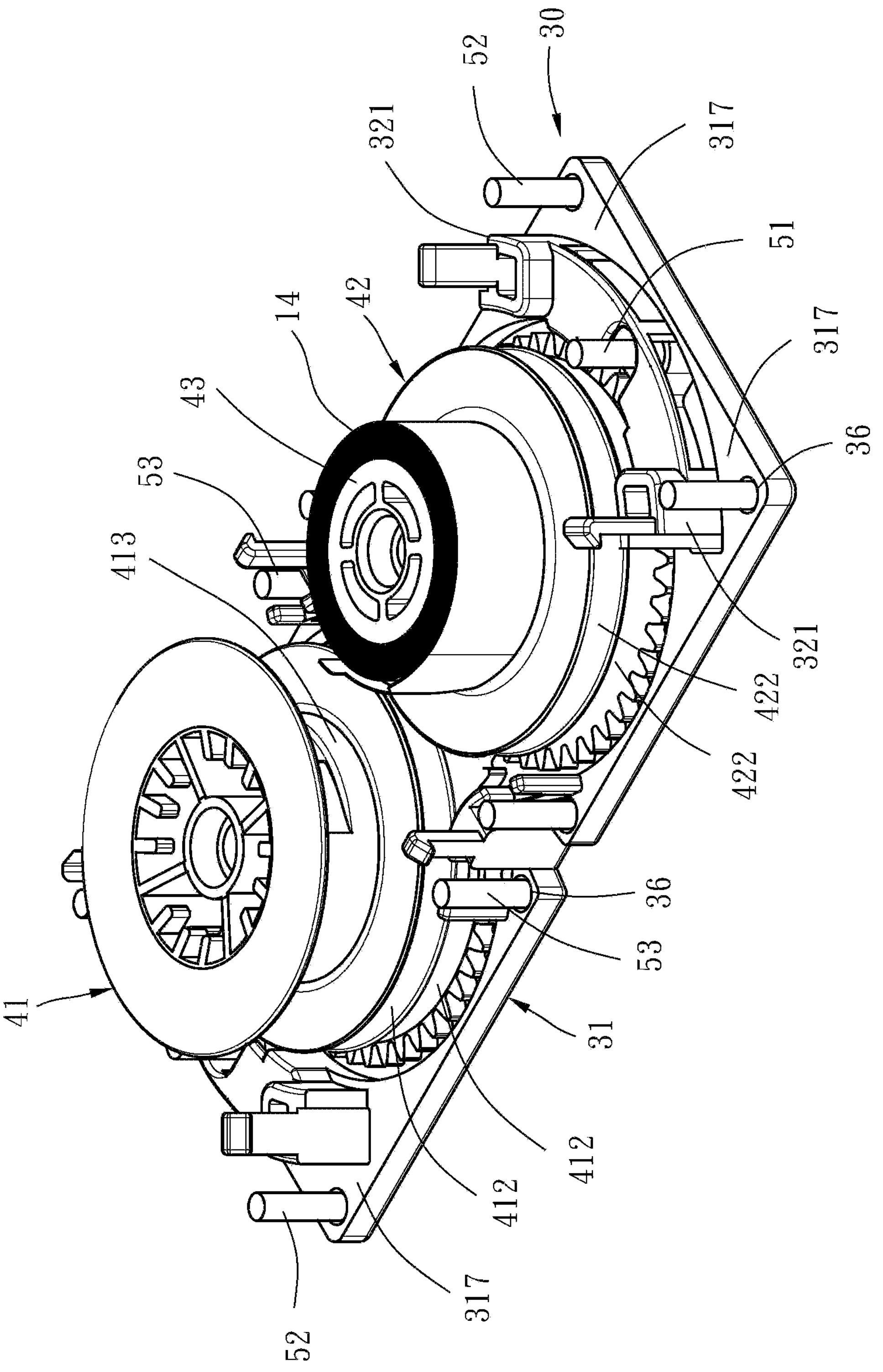
FIG. 3 is similar to FIG. 1, but not showing a first seat of a frame of the pulling cord control device.

Referring to FIG. 1 to FIG. 3, a pulling cord control device 10 for a window blind according to a first preferred embodiment of the present invention includes a frame 12, a pulling cord control wheel set 40, a coil spring 14, and ten resistance pillars including two first resistance pillars 51, four second resistance pillars 52 and four third resistance pillars 53.

The frame 12 includes a first seat 20 and a second seat 30. The first seat 20 includes a first base 21 approximately shaped as a rectangular plate, two outside connecting portions 22 integrally extending from the left side and the right side of the first base 21 respectively, and two central connecting portions 23 integrally extending from the center of the front side and the center of the rear side of the first base 21 respectively. The second seat 30 includes a second base 31 approximately shaped as a rectangular plate, two dividing racks 32 integrally extending from the second base 31 and located adjacent to the left side and the right side of the second base 31 respectively, and two central connecting portions 33 integrally extending from the center of the front side and the center of the rear side of the second base 31 respectively. The outside connecting portions 22 and central connecting portions 23 of the first seat 20 are connected with the dividing racks 32 and central connecting portions 33 of the second seat 30 respectively, so that the first seat 20 and the second seat 30 are fixed to each other, and an accommodating space 16 is formed between the first seat 20 and the second seat 30.

Figure 4:
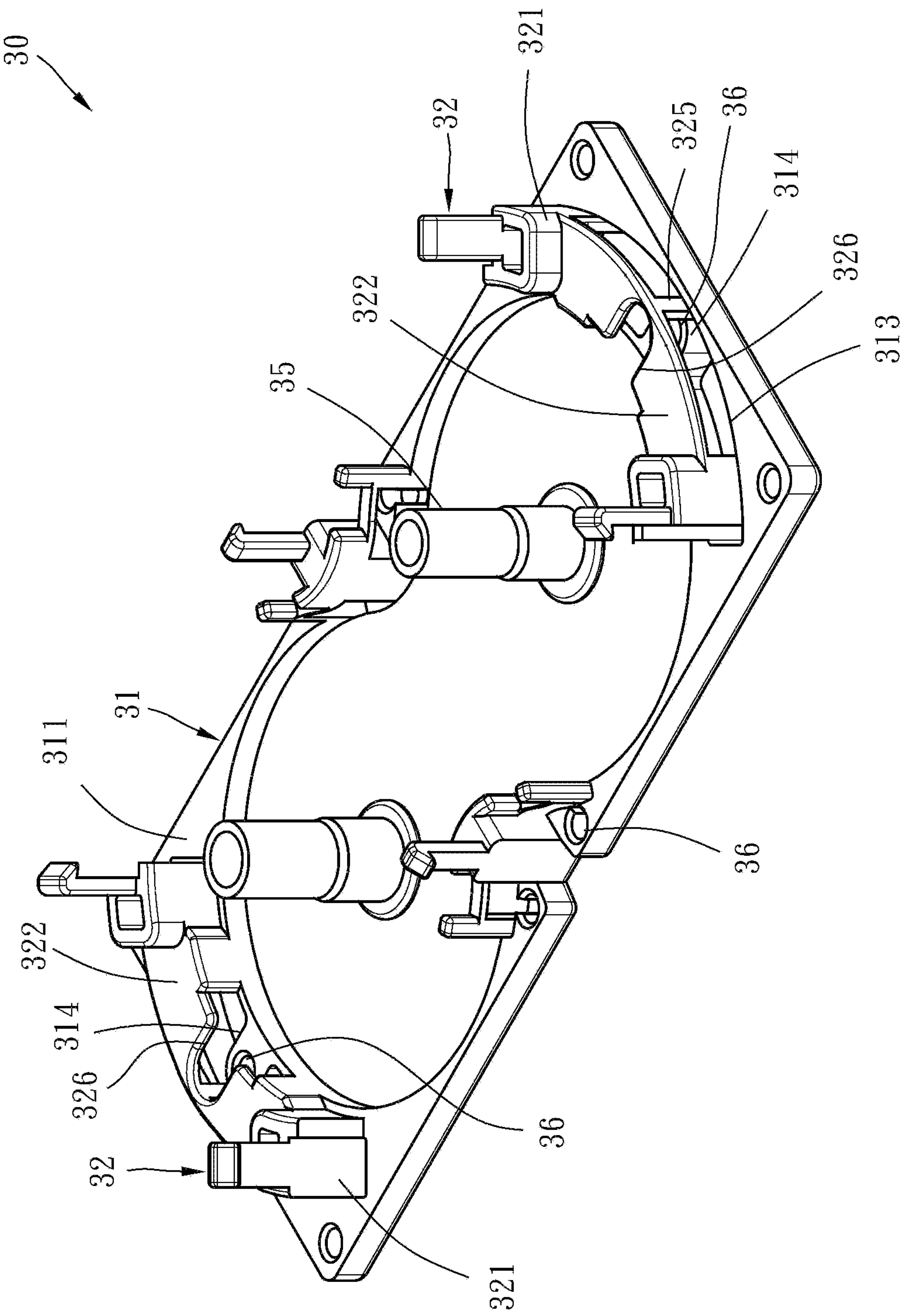
FIG. 4 and FIG. 5 are perspective views of a second seat of the frame of the pulling cord control device.
Figure 5:
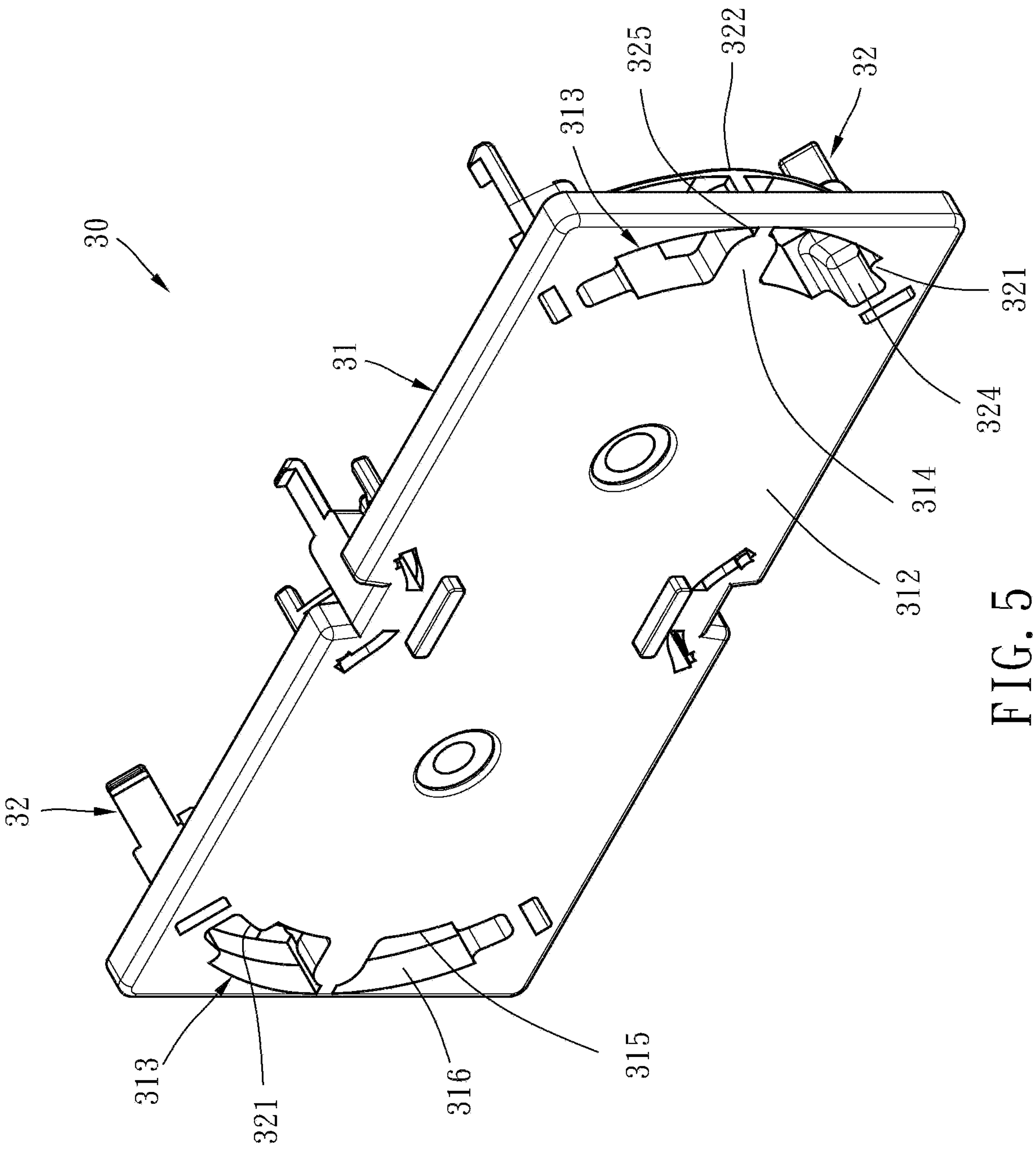
Figure 6:
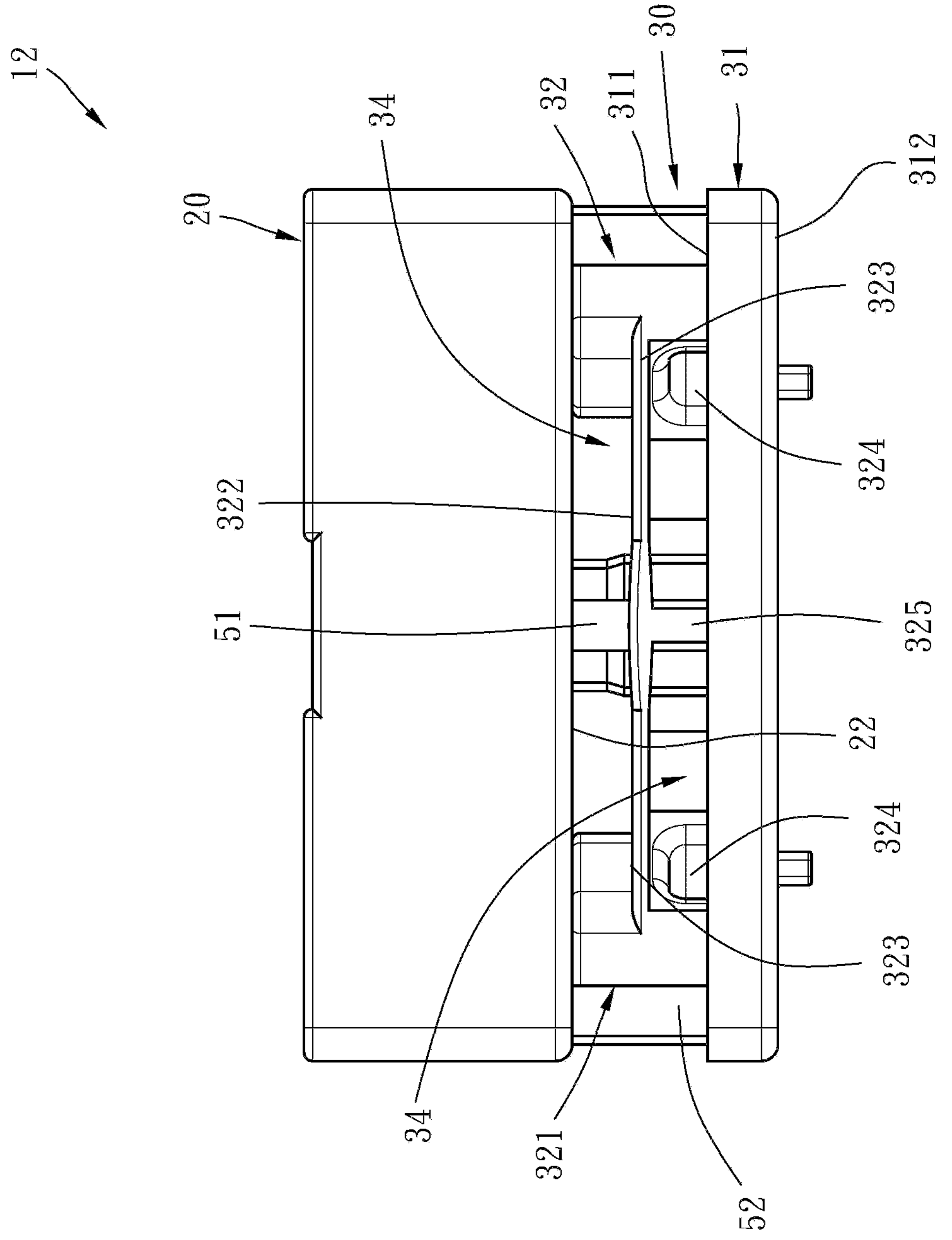
FIG. 6 is a side view of the frame and a plurality of resistance pillars of the pulling cord control device.

Referring to FIG. 4 and FIG. 5, the second base 31 of the second seat 30 includes an inner surface 311 facing toward the first base 21, an outer surface 312 facing toward opposite direction to the inner surface 311, and two grooves 313 penetrating through the inner surface 311 and the outer surface 312. The two dividing racks 32 are located in the two grooves 313 respectively. The dividing rack 32 includes two protruding base portions 321 located adjacent to two ends of the groove 313 respectively, and a dividing plate 322 connected between the two protruding base portions 321. The protruding base portion 321 extends from the outer surface 312 of the second base 31, extends through the groove 313, and protrudes out of the inner surface 311 of the second base 31. Referring to FIG. 6, the protruding base portion 321 has a connected part 323 located above the inner surface 311 of the second base 31, and a recess 324 recessed from the outer surface 312 of the second base 31 to the connected part 323, which means the recess 324 extends from the outer surface 312 of the second base 31 above the inner surface 311. The dividing plate 322 is integrally connected with the connected parts 323 of the two protruding base portions 321, which means the dividing plate 322 is also located above the inner surface 311 of the second base 31. Therefore, the dividing plate 322 is suspended between the outside connecting portion 22 of the first seat 20 and the groove 313 of the second seat 30, so that two cord passing grooves 34 are formed between the dividing plate 322 and the first and second seats 20 and 30 respectively.

It should be mentioned here that among the two seats of the frame 12, the seat including the dividing rack 32 is called the second seat 30 in this embodiment, and the first seat 20 includes the outside connecting portion 22. The outside connecting portion 22 and the dividing rack 32 collectively form the cord passing groove 34. The first seat 20 is disposed on the second seat 30, which means the second seat 30 can be regarded as a bottom seat, the first seat 20 can be regarded as a top cover, and the dividing rack 32 is a part of the bottom seat. However, the present invention is unlimited thereto, but may be configured in a way that the dividing rack 32 is a part of the top cover. As shown in FIG. 2, the second seat 30 in this embodiment includes two axles 35 shaped as circular pipes. The axles 35 integrally extend from the second base 31 upwardly, and are located in the accommodating space 16 of the frame 12 for the pulling cord control wheel set 40 to be sleeved onto the axles 35 and thereby positioned in the accommodating space 16. It can be known from the above description that the axles 35 in this embodiment are unlimited to extend from the second base 31 which is integrally connected with the dividing rack 32, but may extend from the first base 21.

The pulling cord control wheel set 40 in this embodiment includes two cord winding wheels 41 and 42, and a coil spring winding wheel 43. The cord winding wheel 41, from bottom to top thereof in order, includes a teeth portion 411, and two pulling cord winding portions 412 and a coil spring winding portion 413, which are shaped as annular grooves. The cord winding wheel 42, from bottom to top thereof in order, includes a teeth portion 421, and two pulling cord winding portions 422 shaped as annular grooves. The coil spring winding wheel 43 only includes a coil spring winding portion 431. The cord winding wheels 41 and 42 are sleeved onto the axles 35 respectively, and the teeth portions 411 and 421 thereof are engaged with each other. The coil spring winding wheel 43 is sleeved onto the same axle 35 with the cord winding wheel 42, and located correspondingly to the coil spring winding portion 413 of the cord winding wheel 41 for the coil spring 14 to be wound around the coil spring winding portions 413 and 431. For the simplification of the figures and the convenience of illustration, the figures of the present invention only show that the coil spring 14 is wound around the coil spring winding portion 431, but in practice the coil spring 14 is wound around the coil spring winding portions 413 and 431 at the same time.

Figure 7:
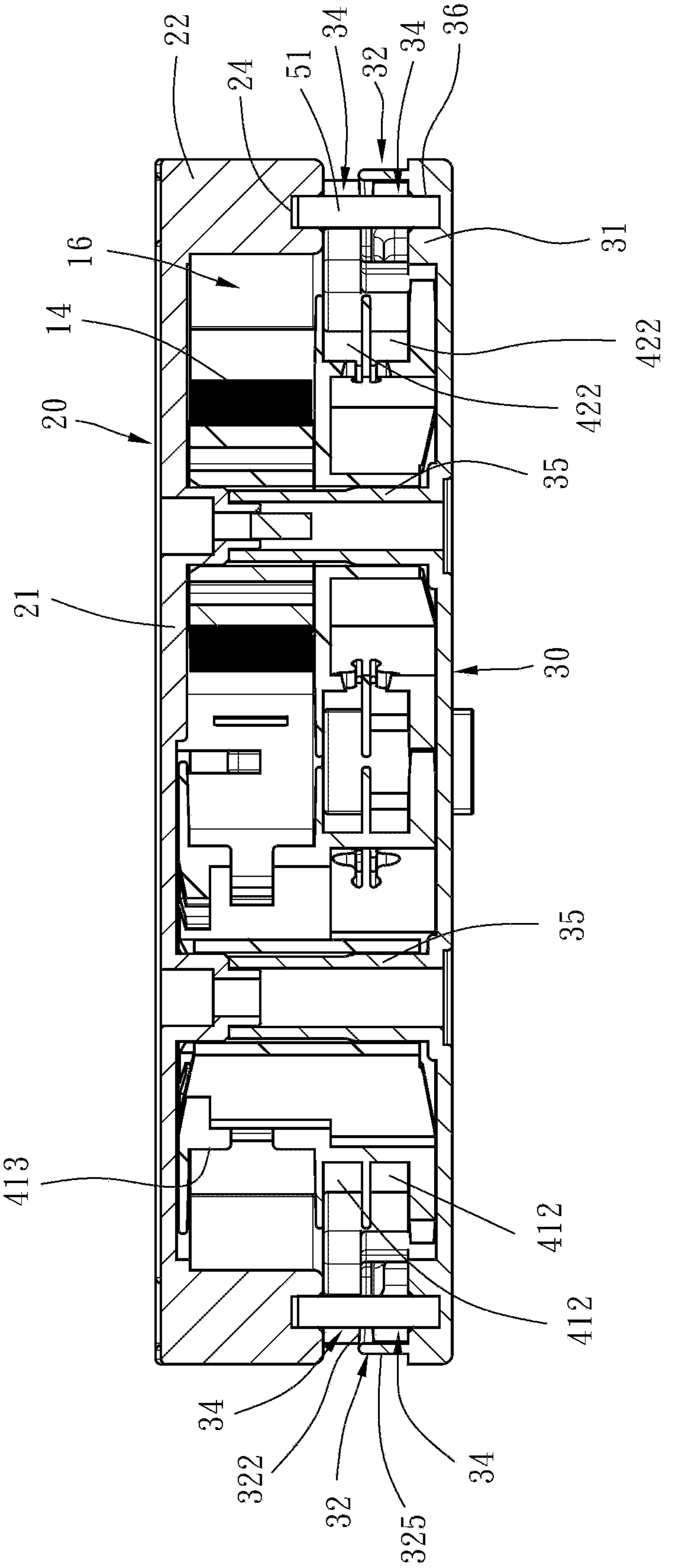
FIG. 7 is a sectional view taken along the line 7-7 in FIG. 1.

As shown in FIG. 6 and FIG. 7, the two pulling cord winding portions 412 of the cord winding wheel 41 respectively face toward the two cord passing grooves 34 formed by the dividing rack 32 located adjacent to the two pulling cord winding portions 412, i.e. the dividing rack 32 on the left side in FIG. 7, thereby adapted for two pulling cords (not shown) to be wound around the pulling cord winding portions 412 respectively and pass through the cord passing grooves 34 on the left side respectively to the outside, so as to pass through a headrail and slats of the window blind to be connected with a bottom rail (not shown). Likewise, the two pulling cord winding portions 422 of the cord winding wheel 42 respectively face toward the two cord passing grooves 34 formed by the dividing rack 32 located adjacent to the two pulling cord winding portions 422, i.e. the dividing rack 32 on the right side in FIG. 7, thereby adapted for two other pulling cords to be wound around the pulling cord winding portions 422 respectively and pass through the cord passing grooves 34 on the right side respectively to the outside, so as to pass through the headrail and the slats of the window blind to be connected with the bottom rail.

Through the effect of the pulling cord control wheel set 40 and the coil spring 14 of the pulling cord control device 10, the user can pull the bottom rail of the window blind to control the opening and closing of the window blind, and can stop the bottom rail at any position between the uppermost position and the lowermost position. Besides, the pulling cord control wheel set 40 in this embodiment includes four pulling cord winding portions 412 and 422, adapted for four pulling cords to be wound thereon, and the frame 12 is adapted for the pulling cords to pass through different cord passing grooves 34 respectively to the outside, thereby preventing the pulling cords from interference with each other. It is further important that the frame 12 is composed of only the first and second seats 20 and 30 connected with each other, which has simple structure formed with the above-described cord passing grooves 34 for preventing the pulling cords from interference, so that the pulling cord control device 10 is fast in assembling process and relatively lower in producing cost. In addition, the configuration design of the dividing rack 32 enables the second seat 30 to be molded by only an upper mold and a lower mold, and after the molding, the demolding is performed only upwardly and downwardly to the upper and lower molds respectively. Such manufacturing process is relatively faster, and the producing cost is relatively lower.

As shown in FIG. 2 and FIG. 3, the second base 31 of the second seat 30 further has ten installation holes 36 for the first, second and third resistance pillars 51, 52 and 53 to be inserted therein. The first seat 20 is also provided at the corresponding positions with installation holes 24, as shown in FIG. 7, so that the first, second and third resistance pillars 51, 52 and 53 are rotatably disposed between the first and second seats 20 and 30. In this way, the user can wind the pulling cord around one or some of the first, second and third resistance pillars 51, 52 and 53 according to the required pulling cord resistance, so as to improve the stability of the pulling cord control device 10 controlling the pulling cord.

As shown in FIG. 4 and FIG. 5, the dividing rack 32 of the second seat 30 in this embodiment further includes a supporting post 325. The supporting post 325 extends from the outer surface 312 of the second base 31, extends through the groove 313, and protrudes out of the inner surface 311 of the second base 31. The supporting post 325 is located between the two protruding base portions 321 of the dividing rack 32, and integrally connected with the dividing plate 322, capable of improving the structural strength of the dividing rack 32. In addition, each of the grooves 313 of the second base 31 is provided therein with an installation block 314. The installation block 314 has an installation hole 36, and the dividing plate 322 of the dividing rack 32 has a through groove 326 located opposite to the installation block 314. The first resistance pillar 51 is inserted through the through groove 326 of the dividing plate 322 of the dividing rack 32 and disposed between the outside connecting portion 22 of the first seat 20 and the installation block 314 of the second seat 30, so that the pulling cord can be wound around the first resistance pillar 51 in the cord passing groove 34 to attain great stability. As shown in FIG. 5, the groove 313 includes two inner wall surfaces 315 and 316 facing each other. The above-described installation block 314 and supporting post 325 integrally extend from the inner wall surfaces 315 and 316 respectively, and the installation block 314 and the supporting post 325 are integrally connected with each other. The installation block 314 and the supporting post 325 in this embodiment not only can attain the above-described effects, but also enables the second seat 30 to be molded by only the above-described upper mold and lower mold to still have the advantages of being fast in manufacturing process and relatively lower in producing cost.

The dividing rack 32 in this embodiment is arc-shaped, so that the second base 31 has four installation sections 317 located between the left and right sides of the second base 31 and the protruding base portions 321, as shown in FIG. 3. The installation sections 317 are located at four corners of the second base 31 for the second resistance pillars 52 to be disposed in the installation sections 317 respectively. Such arc-shaped dividing rack 32 is not only beneficial for the pulling cord to pass therethrough to the outside in the required direction, but also spares the position for the second resistance pillar 52 to enable the pulling cord to be wound around the second resistance pillar 52 to attain great stability. In addition, it can be seen in FIG. 3 that the cord winding wheels 41 and 42 are each provided by one side thereof with a first resistance pillar 51 and two second resistance pillars 52, and another side of each of the cord winding wheels 41 and 42 is provided with two third resistance pillars 53. As a result, the cord winding wheels 41 and 42 are each surrounded by five resistance pillars, which is beneficial for the user to modify the amount, position and winding manner of the resistance pillar the pulling cord is wound around according to the required pulling cord resistance.

Figure 8:
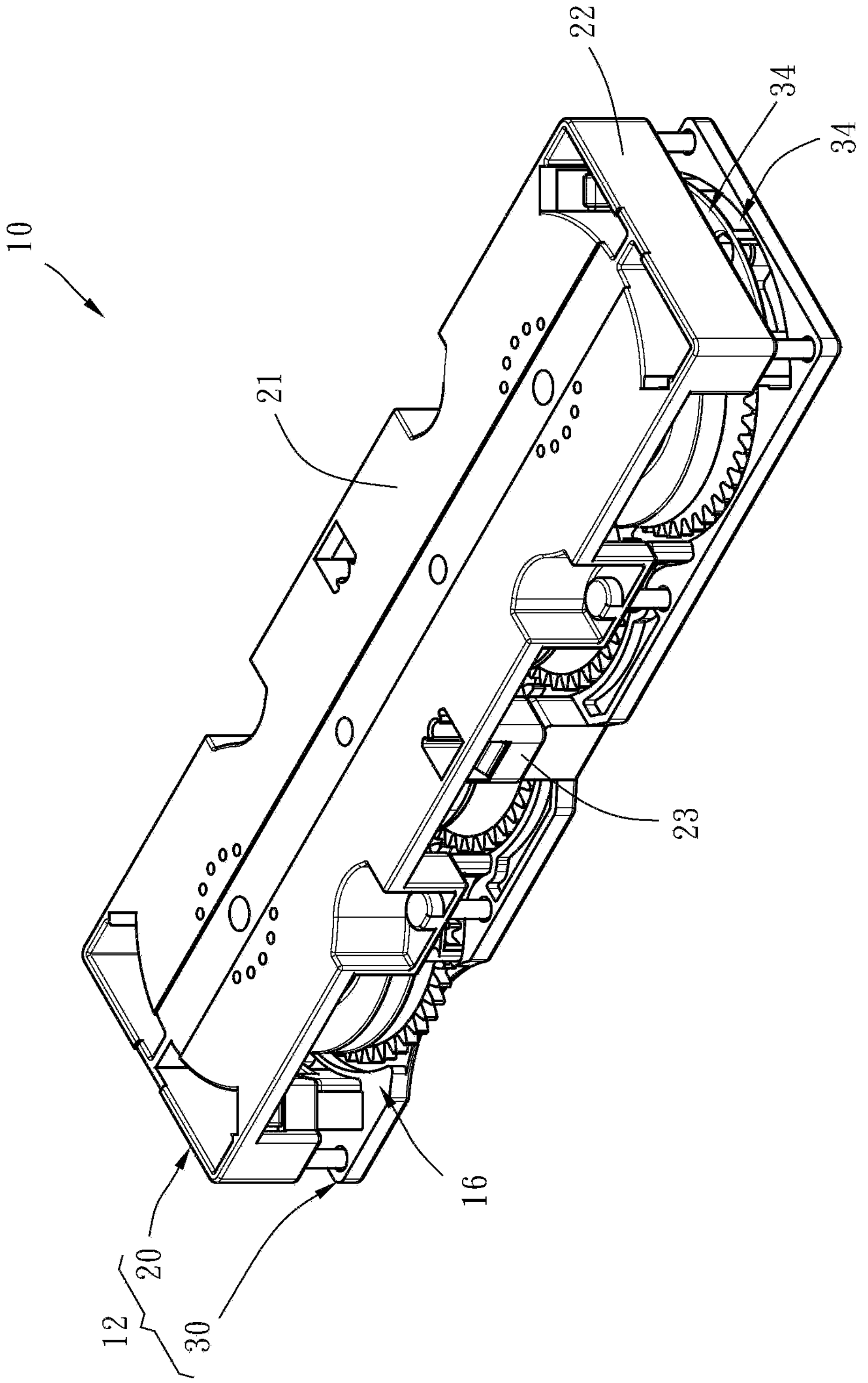
FIG. 8 is an assembled perspective view of a pulling cord control device for a window blind according to a second preferred embodiment of the present invention.
Figure 9:
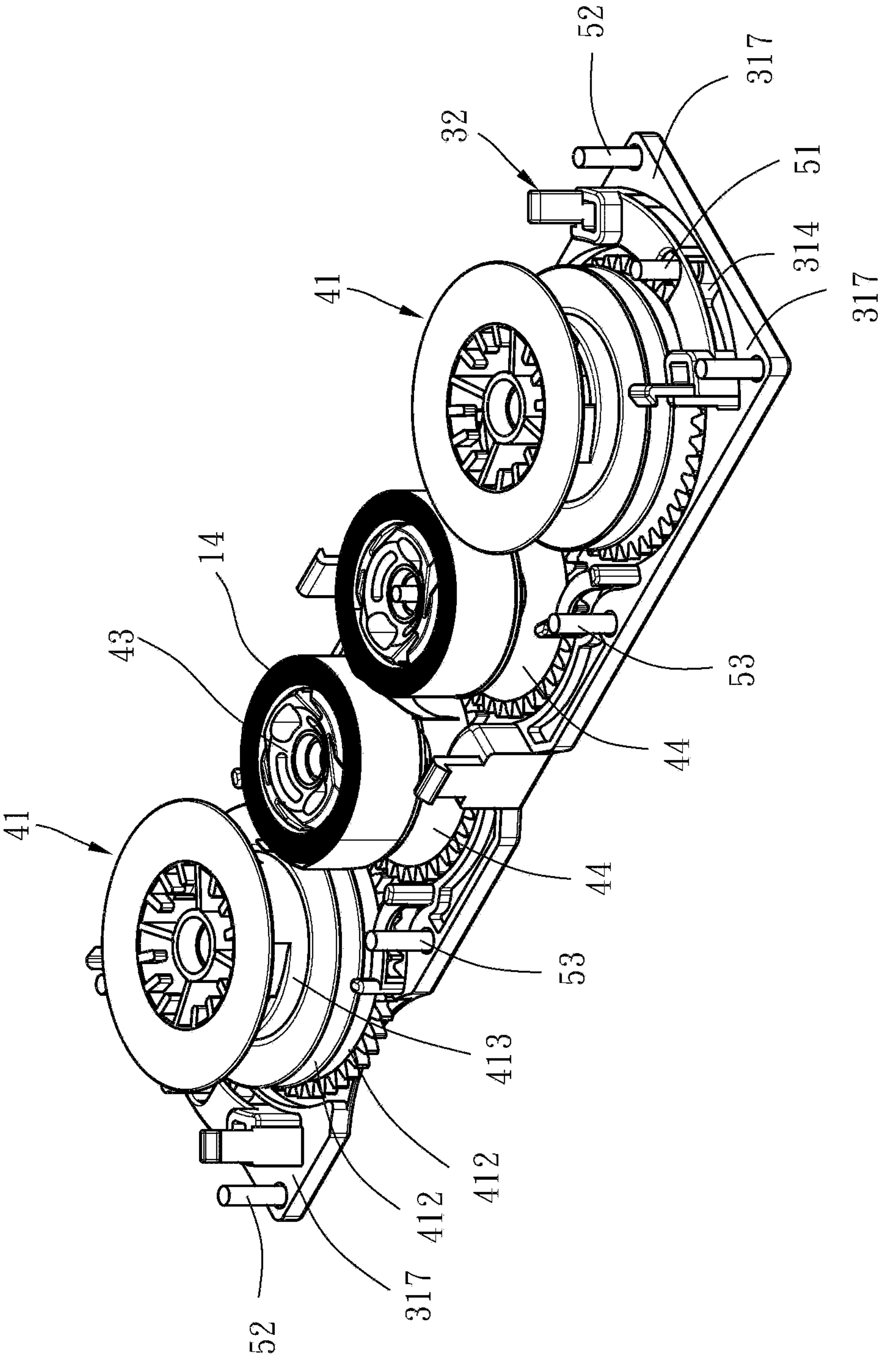
FIG. 9 is similar to FIG. 8, but not showing a first seat of a frame of the pulling cord control device.
Figure 10:
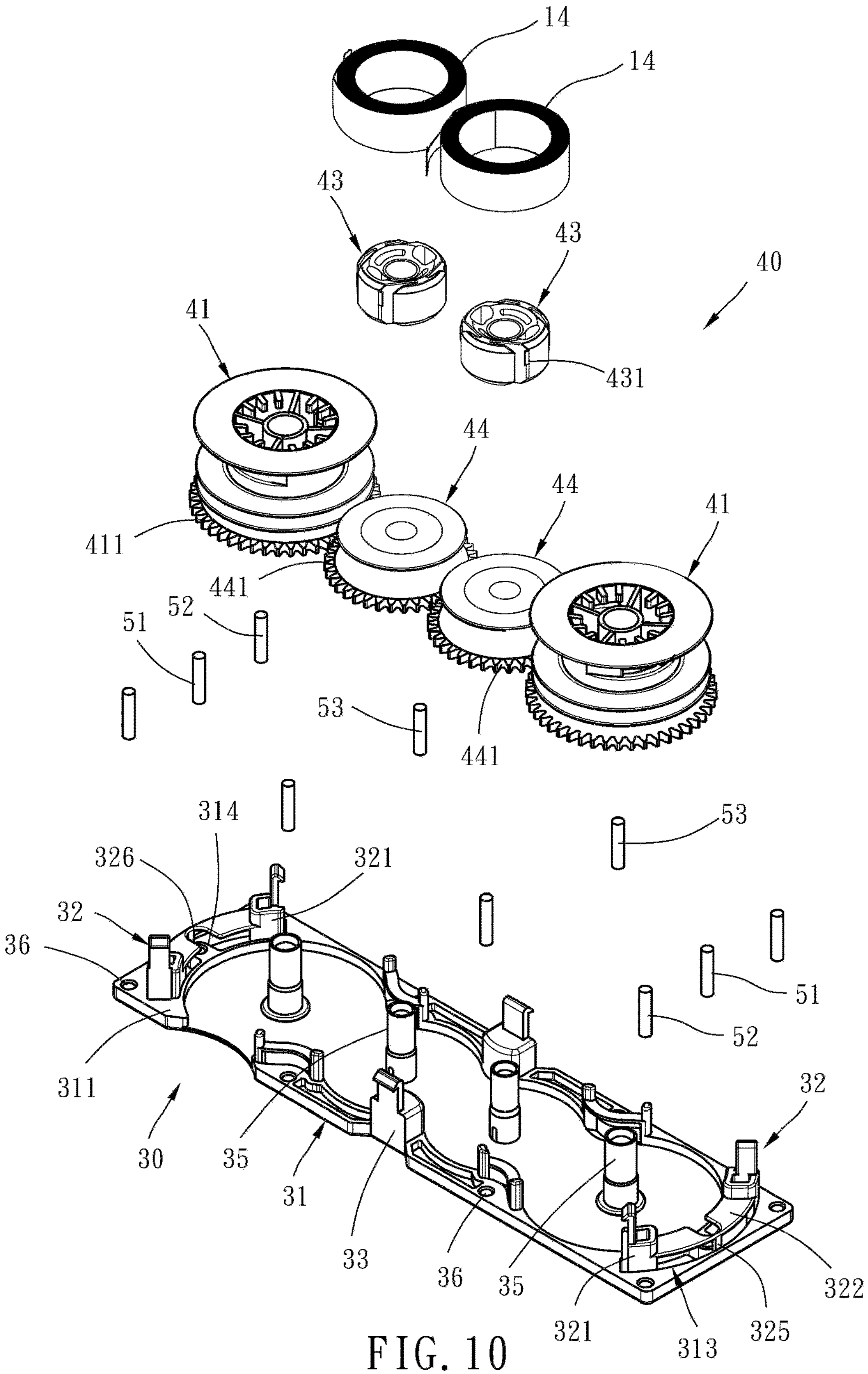
FIG. 10 is an exploded perspective view of FIG. 9.
Figure 11:
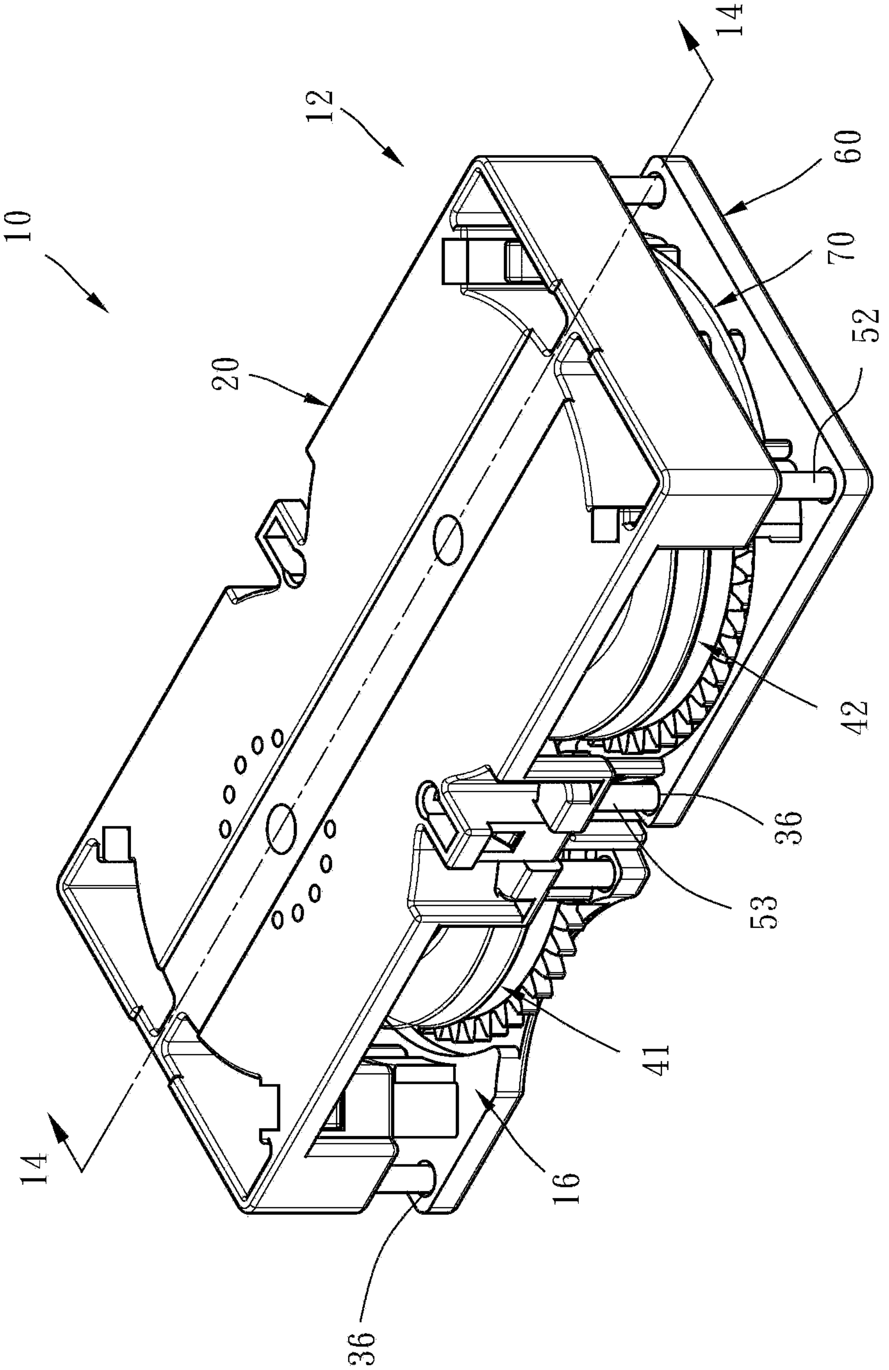
FIG. 11 is an assembled perspective view of a pulling cord control device for a window blind according to a third preferred embodiment of the present invention.
Figure 12:
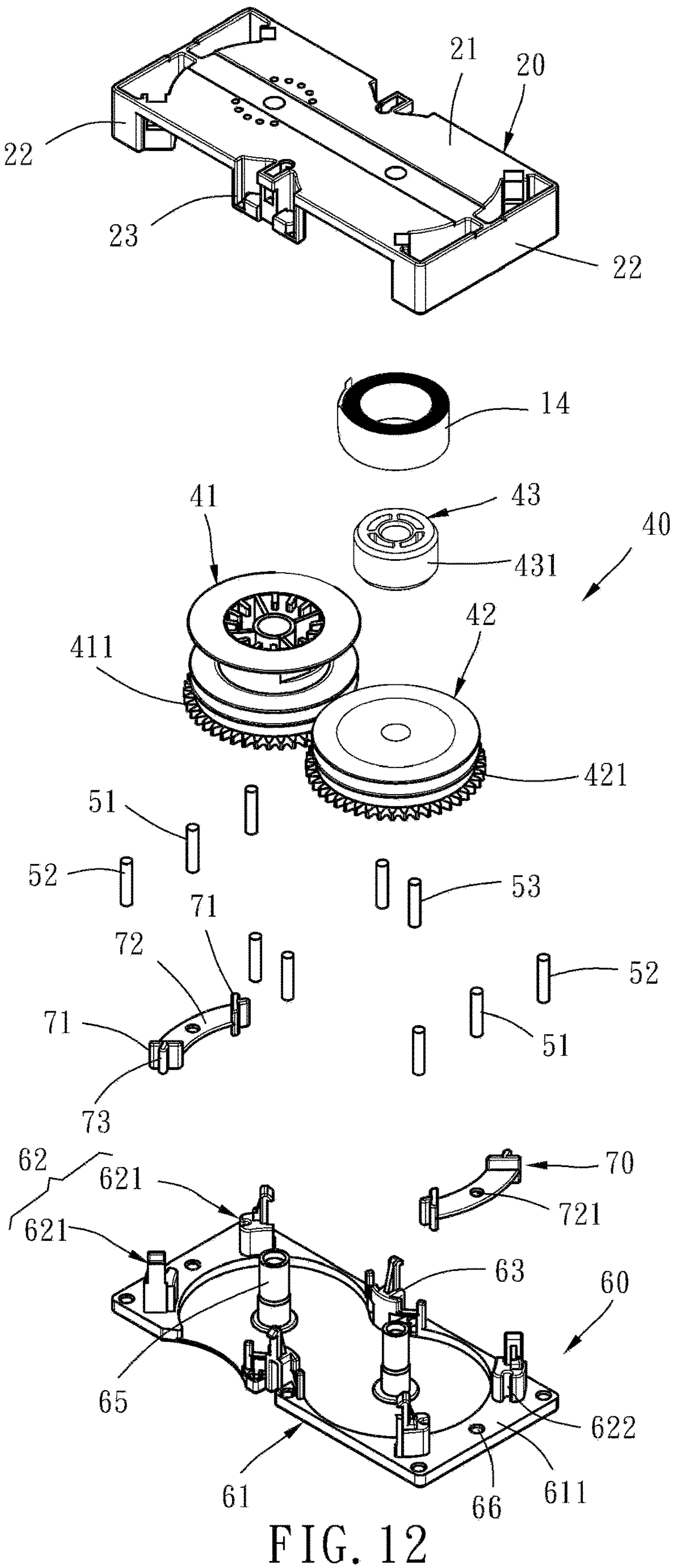
FIG. 12 is an exploded perspective view of the pulling cord control device.
Figure 13:
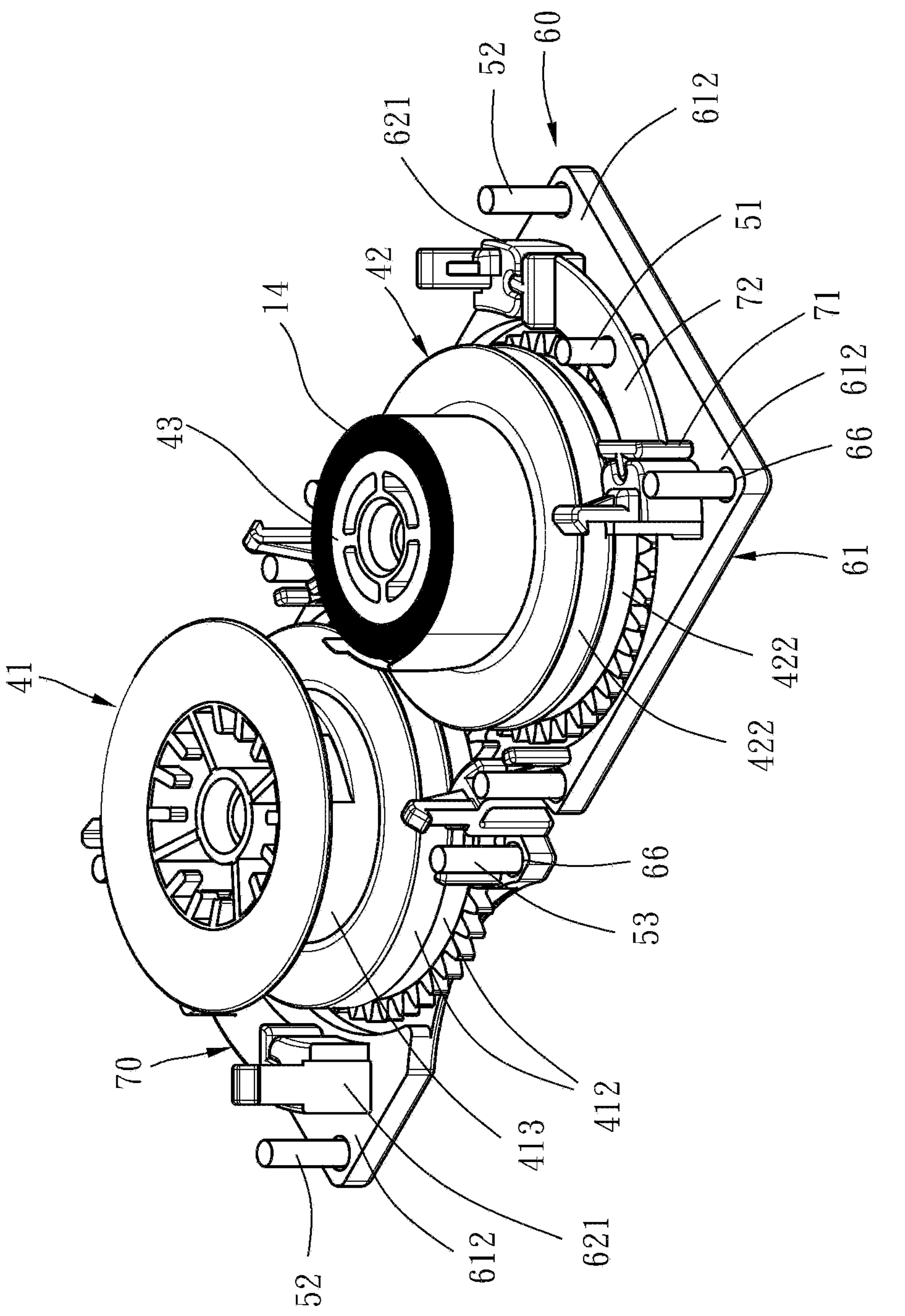
FIG. 13 is similar to FIG. 11, but not showing a first seat of a frame of the pulling cord control device.

Referring to FIG. 8 to FIG. 10, a second preferred embodiment of the present invention is similar to the first preferred embodiment, but the primary difference therebetween lies in that the pulling cord control wheel set 40 in this embodiment includes two cord winding wheels 41, two coil spring winding wheels 43 and two transmission wheels 44. The cord winding wheel 41 and the coil spring winding wheel 43 are the same with those described in the first preferred embodiment. The transmission wheel 44 also includes a teeth portion 441, but has no pulling cord winding portion or coil spring winding portion. Alternatively, there may be an additional coil spring wound around the two transmission wheels. Corresponding to the above-described pulling cord control wheel set 40, the second seat 30 in this embodiment includes four axles 35. The axles 35 integrally extend from the second base 31 upwardly, and are located in the accommodating space 16 of the frame 12 for the pulling cord control wheel set 40 to be sleeved onto the axles 35 and thereby positioned in the accommodating space 16.

Specifically speaking, the cord winding wheels 41 are sleeved onto the two outside axles 35 respectively, and thereby located adjacent to the dividing racks 32 of the second seat 30 respectively. The transmission wheels 44 are sleeved onto the two inside axles 35 respectively, and the teeth portions 441 are engaged with each other. The teeth portions 441 of the transmission wheels 44 are also engaged with the teeth portions 411 of the cord winding wheels 41 respectively. The coil spring winding wheels 43 are also sleeved onto the two inside axles 35 respectively, and located correspondingly to the coil spring winding portions 413 of the cord winding wheels 41 for two coil springs 14 to be wound around the coil spring winding portions 413 and 431 of two pairs of cord winding wheel 41 and coil spring winding wheel 43 respectively. Other parts of this embodiment are all similar to those of the first preferred embodiment, and can attain the same effects with the first preferred embodiment, thereby not repeatedly described hereinafter.

Referring to FIG. 11 to FIG. 14, a pulling cord control device 10 for a window blind according to a third preferred embodiment of the present invention includes a frame 12, a pulling cord control wheel set 40, a coil spring 14, and ten resistance pillars including two first resistance pillars 51, four second resistance pillars 52 and four third resistance pillars 53.

The frame 12 in this embodiment includes a first seat 20, a second seat 60 and two dividing racks 70, wherein the first seat 20 is the same with that described in the first preferred embodiment and can attain the same effects, thereby not repeatedly described hereinafter. The second seat 60 includes a second base 61 approximately shaped as a rectangular plate, two installation portions 62 integrally extending from the second base 61 and located adjacent to the left side and the right side of the second base 61 respectively, and two central connecting portions 63 integrally extending from the center of the front side and the center of the rear side of the second base 61 respectively. The outside connecting portions 22 and central connecting portions 23 of the first seat 20 are connected with the installation portions 62 and central connecting portions 63 of the second seat 60 respectively, so that the first seat 20 and the second seat 60 are fixed to each other, and an accommodating space 16 is formed between the first seat 20 and the second seat 60. The dividing racks 70 are disposed on the installation portions 62 of the second seat 60 respectively, and located between the outside connecting portions 22 of the first seat 20 and the second base 61 of the second seat 60.

Specifically speaking, the second base 61 includes an inner surface 611 facing toward the first base 21. Each installation portion 62 includes two protruding base portions 621 protruding out of the inner surface 611 of the second base 61. Each protruding base portion 621 has an inserting groove 622 extending vertically. Each dividing rack 70 includes two vertical plates 71, a dividing plate 72 integrally extending from one side of one of the vertical plates 71 to one side of the other vertical plate 71 horizontally, and two convex stripes 73 protruding from another side of the two vertical plates 71 respectively. The dividing rack 70 is disposed between the two protruding base portions 621 in a way that the convex stripe 73 are embedded in the inserting grooves 622 respectively. After the assembly of the frame 12 is accomplished, the dividing plate 72 of each dividing rack 70 is suspended between the first and second seats 20 and 60, so that two cord passing grooves 64 are formed between the dividing plate 72 and the first and second seats 20 and 60 respectively.

It should be mentioned here that among the two seats of the frame 12, the seat on which the dividing racks 70 are disposed is called the second seat 60 in this embodiment, and the first seat 20 includes the outside connecting portion 22. The outside connecting portion 22 and the dividing rack 70 collectively form the cord passing groove 64. The first seat 20 is disposed on the second seat 60, which means the second seat 60 can be regarded as a bottom seat, the first seat 20 can be regarded as a top cover, and the dividing rack 70 is disposed on the bottom seat. However, the present invention is unlimited thereto, but may be configured in a way that the dividing rack 70 is disposed on the top cover. The second seat 60 in this embodiment includes two axles 65 shaped as circular pipes. The axles 65 integrally extend from the second base 61 upwardly, and are located in the accommodating space 16 of the frame 12 for the pulling cord control wheel set 40 to be sleeved onto the axles 65 and thereby positioned in the accommodating space 16. It can be known from the above description that the axles 65 in this embodiment are unlimited to extend from the second base 61, but may extend from the first base 21.

The structures of the pulling cord control wheel set 40 and the coil spring 14, the relation therebetween, and the manner in which they are sleeved onto the axles 65 in this embodiment are the same with those described in the first preferred embodiment and can attain the same effects, thereby not repeatedly described hereinafter. In short, two cord winding wheels 41 and 42 of the pulling cord control wheel set 40 are located adjacent to the dividing racks 70 respectively, and two pulling cord winding portions 412 or 422 of each cord winding wheel 41 or 42 respectively face toward the cord passing grooves 64 formed by the dividing rack 70 located adjacent to the aforementioned pulling cord winding portions 412 or 422.

Figure 14:
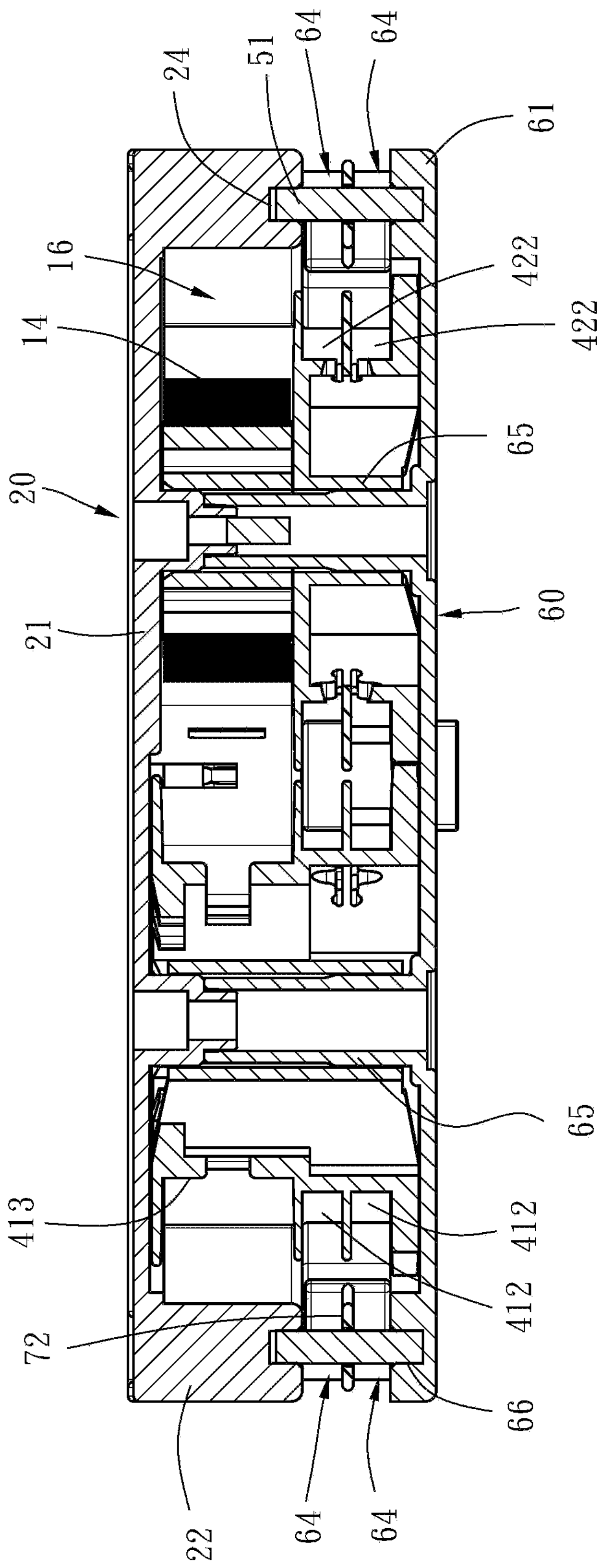
FIG. 14 is a sectional view taken along the line 14-14 in FIG. 11.

The second base 61 of the second seat 60 in this embodiment also has ten installation holes 66 for the first, second and third resistance pillars 51, 52 and 53 to be inserted therein. The first seat 20 is also provided at the corresponding positions with installation holes 24 as shown in FIG. 14, so that the first, second and third resistance pillars 51, 52 and 53 are rotatably disposed between the first and second seats 20 and 60. In this way, the user can wind the pulling cord around one or some of the first, second and third resistance pillars 51, 52 and 53 according to the required pulling cord resistance, so as to improve the stability of the pulling cord control device 10 controlling the pulling cord.

Specifically speaking, the dividing plate 72 of each dividing rack 70 has a through hole 721. The first resistance pillars 51 are inserted through the through holes 721 of the dividing plates 72 of the dividing racks 70 respectively to be disposed between the outside connecting portions 22 of the first seat 20 and the second seat 60, so that the pulling cord can be wound around the first resistance pillar 51 in the cord passing groove 64 to attain great stability. The dividing rack 70 is arc-shaped, so that the second base 61 has four installation sections 612 located between the left and right sides of the second base 61 and the protruding base portions 621, i.e. located at four corners of the second base 61, for the second resistance pillars 52 to be disposed in the installation sections 612 respectively. Such arc-shaped dividing rack 70 is not only beneficial for the pulling cord to pass therethrough to the outside in the required direction, but also spares the position for the second resistance pillar 52 to enable the pulling cord to be wound around the second resistance pillar 52 to attain great stability. In addition, it can be seen in FIG. 13 that the cord winding wheels 41 and 42 are each provided by one side thereof with a first resistance pillar 51 and two second resistance pillars 52, and another side of each of the cord winding wheels 41 and 42 is provided with two third resistance pillars 53. As a result, the cord winding wheels 41 and 42 are each surrounded by five resistance pillars, which is beneficial for the user to modify the amount, position and winding manner of the resistance pillar the pulling cord is wound around according to the required pulling cord resistance.

Figure 15:
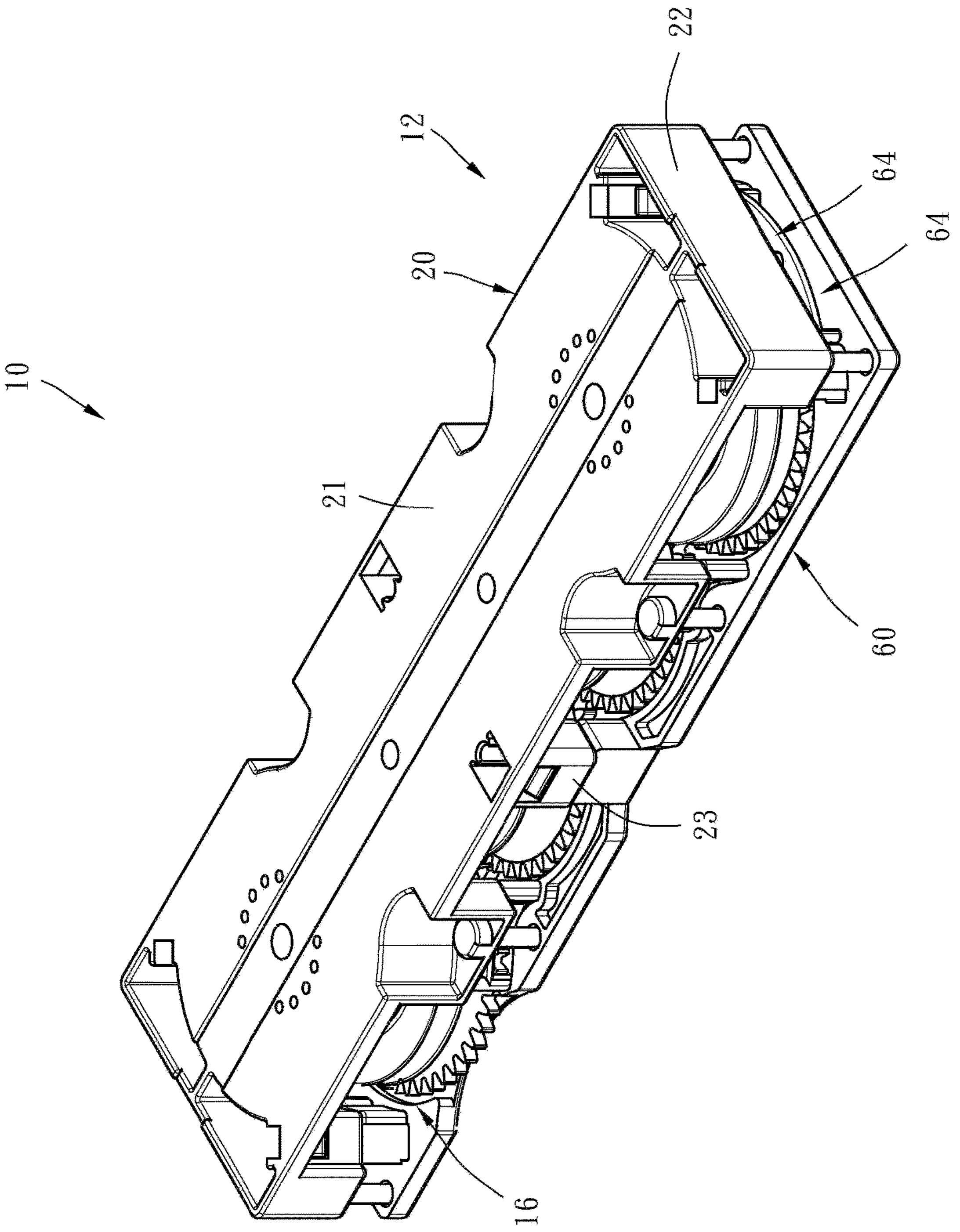
FIG. 15 is an assembled perspective view of a pulling cord control device for a window blind according to a fourth preferred embodiment of the present invention.
Figure 16:
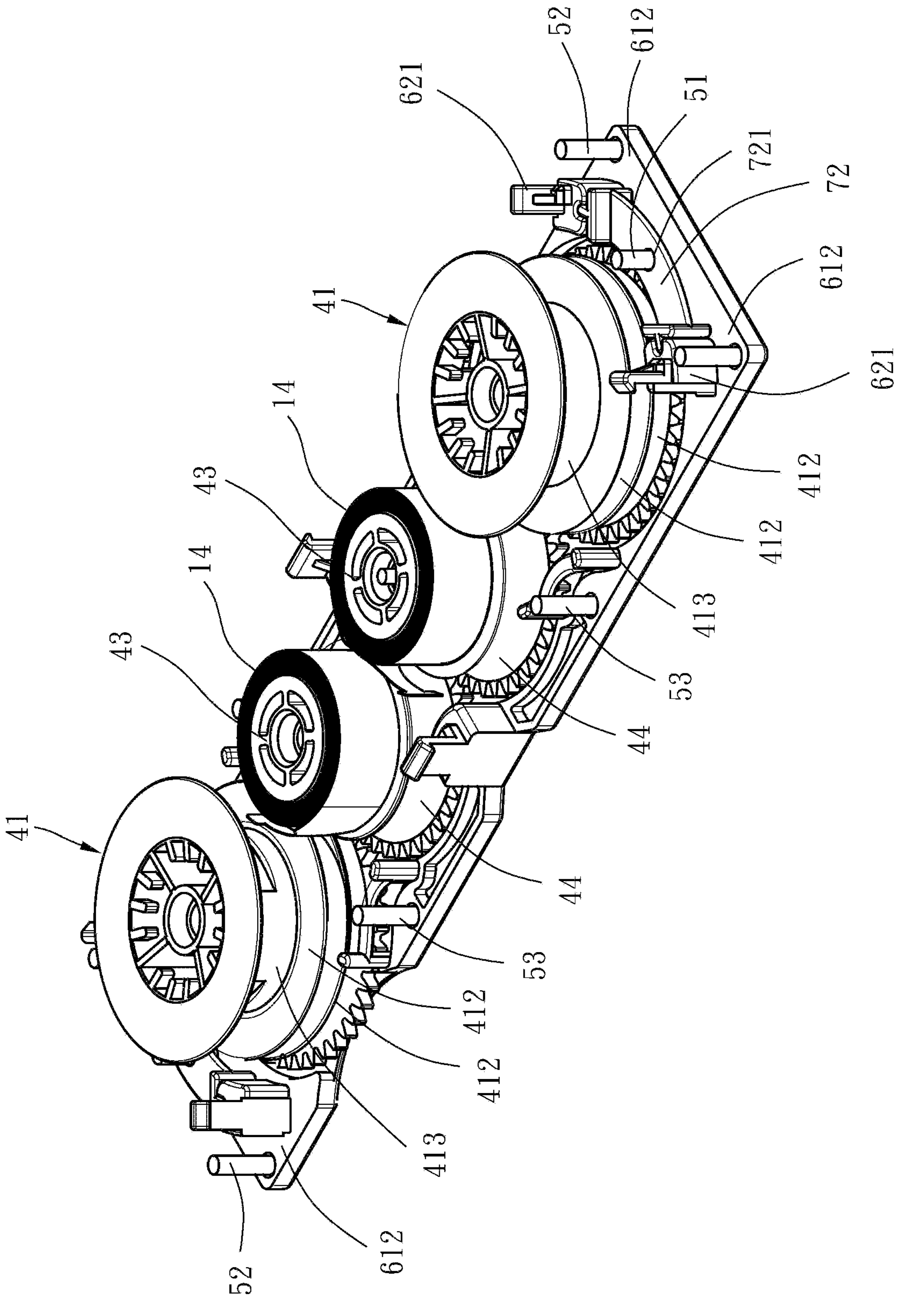
FIG. 16 is similar to FIG. 15, but not showing a first seat of a frame of the pulling cord control device.
Figure 17:
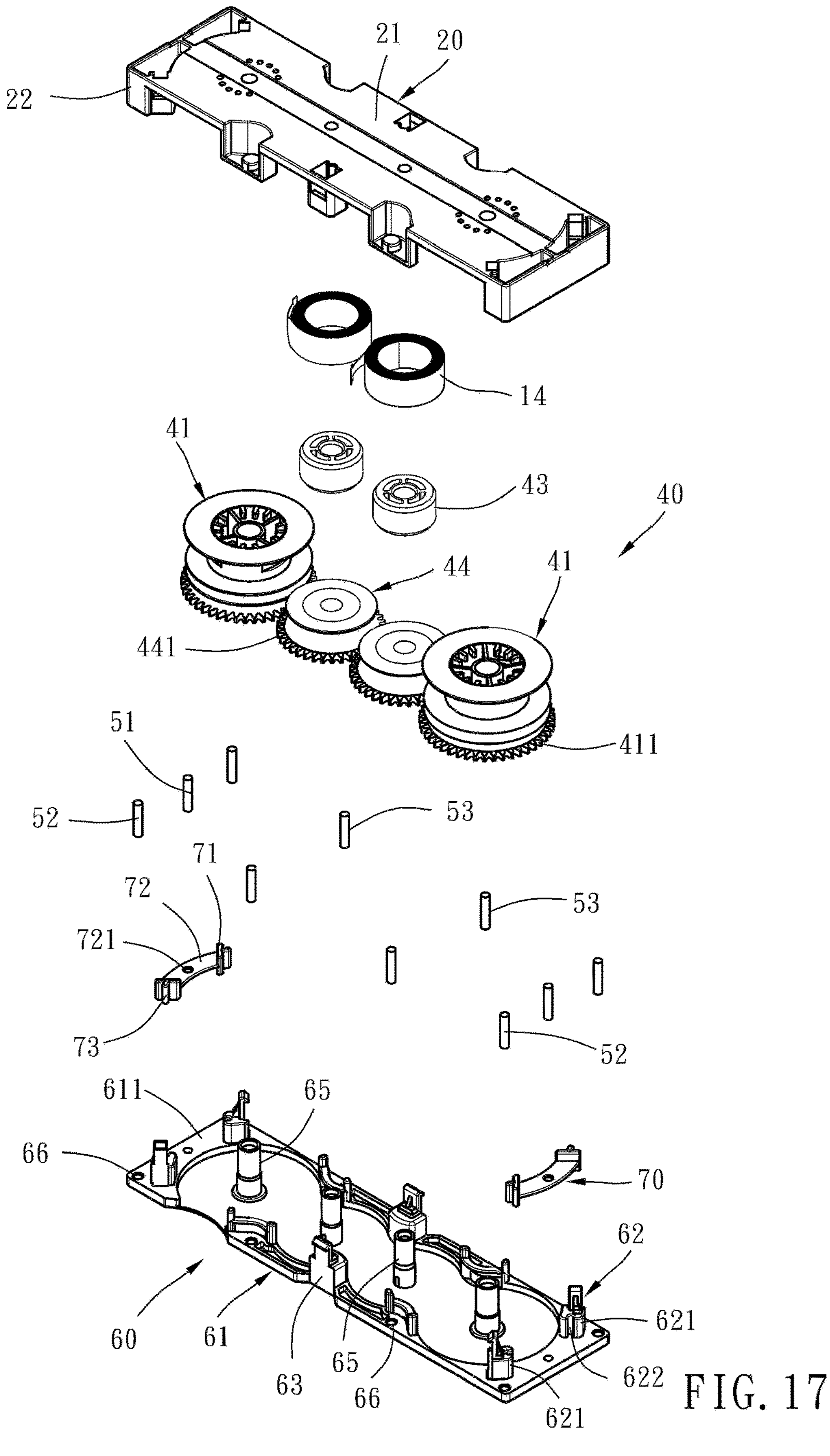
FIG. 17 is an exploded perspective view of the pulling cord control device.

Referring to FIG. 15 to FIG. 17, a fourth preferred embodiment of the present invention is similar to the third preferred embodiment, but the primary difference therebetween lies in that the pulling cord control wheel set 40 in this embodiment is like that provided in the second preferred embodiment. Therefore, the first and second seats 20 and 60 of the frame 12 also have corresponding structures, primarily lying in that the second seat 60 includes four axles 65 extending from the second base 61 for the pulling cord control wheel set 40 to be sleeved onto the axles 65 and thereby positioned in the accommodating space 16. Other parts of this embodiment are all similar to those of each above-described embodiment, and can attain the same effects with the third preferred embodiment, thereby not repeatedly described hereinafter.

It is to be mentioned that the pulling cord control device of the present invention is unlimited for pulling cords to extend to the outside through the left side and the right side of the pulling cord control device, but may be also configured for pulling cords to extend to the outside through the front side and the rear side of the pulling cord control device, or may be configured for pulling cords to extend to the outside through only one side of the pulling cord control device. Therefore, the pulling cord control device may include at least one dividing rack. Under the condition with only one dividing rack, the pulling cord control device may include only one cord winding wheel. The cord winding wheel may be configured with two layers and thereby have two pulling cord winding portions, like that provided in each above-described embodiment, and two pulling cords wound thereon can pass through two cord passing grooves of the same dividing rack to the outside. However, the two cord passing grooves of the same dividing rack are unlimited to both being provided with pulling cords passing therethrough at the same time. Therefore, the pulling cord control wheel set may include at least one pulling cord winding portion. Besides, the configuration design of the dividing rack is unlimited to that the dividing plate is suspended between the outside connecting portion of the first seat and the second base of the second seat, as long as two cord passing grooves are formed on two opposite sides, i.e. upper and lower sides, of the dividing plate. For example, the dividing rack may have a top plate located above the dividing plate, so that one of the cord passing grooves, i.e. the cord passing groove on the upper side of the dividing plate, is formed between the dividing plate and the top plate. Furthermore, under the condition with two cord winding wheels and two coil spring winding wheels, one of the cord winding wheels and one of the coil spring winding wheels may be sleeved onto the same axle, such that there may be only three axles.

In summary, the pulling cord control device of the present invention can be improved in function thereof, i.e. providing resistance to the pulling cord, by being provided with the resistance pillar. In this way, the window blind requires no additional pulling cord resistance device, so that the window blind, in its entirety, has relatively fewer components and simple structure, thereby relatively faster in assembling process and relatively lower in producing cost. Besides, the structure for dividing the pulling cords in the present invention can be integrally included in the second seat, i.e. the second seat 30 in the first and second preferred embodiments, so that the pulling cord control device has relatively fewer components and simple structure, thereby relatively faster in assembling process and relatively lower in producing cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pulling cord control device for a window blind, the pulling cord control device comprising:

a frame comprising a first seat and a second seat, which are connected with each other, and an accommodating space formed between the first seat and the second seat, the first seat comprising a first base, the second seat comprising a second base and at least one dividing rack integrally extending from the second base, the second base comprising an inner surface facing toward the first base, the dividing rack comprising two protruding base portions and a dividing plate, each of the protruding base portions protruding out of the inner surface of the second base, each of the protruding base portions having a connected part, the dividing plate being integrally connected with the connected parts of the two protruding base portions so that two cord passing grooves are formed on two opposite sides of the dividing plate respectively;

a pulling cord control wheel set disposed in the accommodating space of the frame, the pulling cord control wheel set comprising at least two coil spring winding portions and at least one pulling cord winding portion, the pulling cord winding portion facing toward one of the cord passing grooves of the frame; and at least one coil spring wound around the coil spring winding portions of the pulling cord control wheel set;

wherein the second base comprises an outer surface opposite to the inner surface, and at least one groove penetrating through the inner surface and the outer surface; the dividing rack is located in the groove; each of the protruding base portions extends from the outer surface of the second base, extends through the groove, and protrudes out of the inner surface of the second base; each of the protruding base portions has a recess recessed from the outer surface of the second base to the connected part.

2. The pulling cord control device as claimed in claim 1, wherein the first seat comprises at least one outside connecting portion connected with the dividing rack of the second seat; the dividing plate of the dividing rack is suspended between the outside connecting portion of the first seat and the second base of the second seat so that the two cord passing grooves are respectively formed between the dividing plate and the outside connecting portion and between the dividing plate and the second base.

3. The pulling cord control device as claimed in claim 1, wherein the dividing rack of the second seat further comprises a supporting post; the supporting post extends from the outer surface of the second base, extends through the groove, and protrudes out of the inner surface of the second base; the supporting post is located between the two protruding base portions and integrally connected with the dividing plate.

4. The pulling cord control device as claimed in claim 1, wherein the pulling cord control device further comprises at least one resistance pillar; the resistance pillar is rotatably disposed between the first seat and the second seat.

5. The pulling cord control device as claimed in claim 4, wherein the second base comprises at least one installation block located in the groove; the dividing plate of the dividing rack has a through groove located opposite to the installation block; the at least one resistance pillar comprises a first resistance pillar; the first resistance pillar is inserted through the through groove of the dividing plate of the dividing rack, and disposed between the first seat and the installation block of the second seat.

6. The pulling cord control device as claimed in claim 5, wherein the dividing rack of the second seat further comprises a supporting post; the supporting post extends from the outer surface of the second base, extends through the groove, and protrudes out of the inner surface of the second base; the supporting post is located between the two protruding base portions and integrally connected with the dividing plate.

7. The pulling cord control device as claimed in claim 6, wherein the groove of the second seat comprises two inner wall surfaces facing each other; the installation block and the supporting post integrally extend from the two inner wall surfaces respectively; the installation block and the supporting post are integrally connected with each other.

8. The pulling cord control device as claimed in claim 5, wherein the dividing rack is arc-shaped; the second base has two installation sections located between a side of the second base and the protruding base portions; the at least one resistance pillar comprises a second resistance pillar; the second resistance pillar is disposed in the installation section.

9. The pulling cord control device as claimed in claim 8, wherein the at least one resistance pillar comprises a third resistance pillar; the pulling cord control wheel set comprises a cord winding wheel; the cord winding wheel is provided by a side thereof with the first resistance pillar; the third resistance pillar is disposed by another side of the cord winding wheel.

10. The pulling cord control device as claimed in claim 4, wherein the dividing rack is arc-shaped; the second base has two installation sections located between a side of the second base and the protruding base portions; one of said at least one resistance pillar is disposed in the installation section.

11. The pulling cord control device as claimed in claim 1, wherein the pulling cord control wheel set comprises two said pulling cord winding portions located adjacent to the dividing rack; the two pulling cord winding portions respectively face toward the two cord passing grooves formed by the dividing rack located adjacent to the two pulling cord winding portions.

12. The pulling cord control device as claimed in claim 1, wherein two axles extend from one of the first base and the second base; the two axles are located in the accommodating space; the pulling cord control wheel set comprises two cord winding wheels; the two cord winding wheels are sleeved onto the two axles respectively.

13. The pulling cord control device as claimed in claim 1, wherein at least three axles extend from one of the first base and the second base; the at least three axles are located in the accommodating space; the pulling cord control wheel set comprises two cord winding wheels and two coil spring winding wheels; the two cord winding wheels and the two coil spring winding wheels are sleeved onto the at least three axles.

14. A pulling cord control device for a window blind, the pulling cord control device comprising:

a frame comprising a first seat and a second seat, which are connected with each other, an accommodating space formed between the first seat and the second seat, and at least one dividing rack, the first seat comprising a first base, the second seat comprising a second base and at least one installation portion connected with the second base, the dividing rack being disposed on the installation portion, the dividing rack comprising a dividing plate so that two cord passing grooves are formed on two opposite sides of the dividing plate respectively;

at least one resistance pillar rotatably disposed between the first seat and the second seat;

a pulling cord control wheel set disposed in the accommodating space of the frame, the pulling cord control wheel set comprising at least two coil spring winding portions and at least one pulling cord winding portion, the pulling cord winding portion facing toward one of the cord passing grooves of the frame; and at least one coil spring wound around the coil spring winding portions of the pulling cord control wheel set;

wherein the second base comprises an inner surface facing toward the first base; the installation portion comprises two protruding base portions protruding out of the inner surface of the second base; the dividing rack is disposed between the two protruding base portions;

wherein the second base has two installation sections located between a side of the second base and the protruding base portions; one of said at least one resistance pillar is disposed in the installation section.

15. The pulling cord control device as claimed in claim 14, wherein the dividing plate of the dividing rack is suspended between the first seat and the second seat so that the two cord passing grooves are respectively formed between the dividing plate and the first seat and between the dividing plate and the second base.

16. The pulling cord control device as claimed in claim 14, wherein the dividing rack is arc-shaped.

17. The pulling cord control device as claimed in claim 14, wherein the pulling cord control wheel set comprises two said pulling cord winding portions located adjacent to the dividing rack; the two pulling cord winding portions respectively face toward the two cord passing grooves formed by the dividing rack located adjacent to the two pulling cord winding portions.

18. The pulling cord control device as claimed in claim 14, wherein two axles extend from one of the first base and the second base; the two axles are located in the accommodating space; the pulling cord control wheel set comprises two cord winding wheels; the two cord winding wheels are sleeved onto the two axles respectively.

19. The pulling cord control device as claimed in claim 14, wherein at least three axles extend from one of the first base and the second base; the at least three axles are located in the accommodating space; the pulling cord control wheel set comprises two cord winding wheels and two coil spring winding wheels; the two cord winding wheels and the two coil spring winding wheels are sleeved onto the at least three axles.

20. The pulling cord control device as claimed in claim 14, wherein the at least one resistance pillar comprises a first resistance pillar, a second resistance pillar and a third resistance pillar; the dividing plate of the dividing rack has a through hole; the first resistance pillar is inserted through the through hole of the dividing plate of the dividing rack, and disposed between the first seat and the second seat; the dividing rack is arc-shaped; the second resistance pillar is disposed in the installation section; the pulling cord control wheel set comprises a cord winding wheel; the cord winding wheel is provided by a side thereof with the first resistance pillar; the third resistance pillar is disposed by another side of the cord winding wheel.

* * * * *